Patented Sept. 3, 1946

2,407,210

UNITED STATES PATENT OFFICE 2,407,210

COLOR COUPLERS

Arnold Weissberger, Charles J. Kibler, and Paul W. Vittum, Rochester, N. Y., assignors to Eastman Kodak Company, Rochester, N. Y., a corporation of New Jersey No Drawing. Application April 14, 1944, Serial No. 531,124

17 Claims. (Cl. 95—6)

This invention relates to photography, and particularly to color-forming coupler compounds. The formation of colored photographic images by coupling the development product of aromatic amino developing agents with color-forming or coupling compounds is well known. In these processes the subtractive process of color formation is ordinarily used and the image dyes are intended to be of the complementary primary colors cyan or blue-green, magenta, and yellow. The couplers which produce the cyan dyes are usually phenols or naphthols, those producing the magenta dyes are ordinarily pyrazolones or cyano acetyl compounds, and those producing the yellow dyes are ordinarily compounds containing a methylene group having two carbonyl groups attached to it. The dyes produced by coupling are azomethines, indamines or indophenols, depending upon the composition of the coupler and of the developer.

One of the disadvantages encountered with coupler compounds, particularly coupler compounds which are incorporated in sensitive emulsions, is that the residual couplers in the emulsion layer interfere with the stability of the dyes formed upon development. Many couplers are either unstable and subject to discoloration themselves or interfere with the stability of the dye formed in the layers in which the couplers are incorporated.

It is, therefore, an object of the present invention to provide a novel class of photographic coupler compounds. A further object is to provide novel couplers which do not interfere with the stability of the dyes formed from them. Other objects will appear from the following description of our invention.

These objects are accomplished according to our invention by the use as coupler compounds of ortho-alkoxy benzoyl acetanilides, particularly compounds having the following structure:

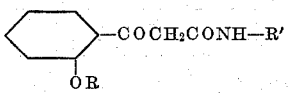

where R is an alkyl radical and R' is an aromatic nucleus of the benzene series.

While benzoyl acetanilide couplers are well known, we have found that benzoyl acetanilide couplers having an ortho alkoxy substituent in the benzoyl nucleus produce improved yellow colors upon color development and interfere with the stability of the yellow dyes thus formed to a considerably less degree than the unsubstituted benzoyl acetanilides. We have also found that a chlorine substituent in the ortho position in the aniline nucleus produces dyes having a greater tinctorial power than dyes produced from couplers having only the ortho alkoxy substituent in the benzoyl nucleus. A combination of the alkoxy group in the ortho position in the phenyl ring of the benzoyl group, with chlorine in the ortho position in the phenyl ring of the aniline group, therefore, produces couplers which result in the formation of yellow dyes of improved color or light absorption characteristics and having high tinctorial strength. The couplers themselves interfere with the dye stability to a considerably diminished degree.

Compounds illustrating our invention are as follows:

1. ⟨⟩-COCH₂CONH-⟨⟩
   OCH₃

2. CH₃
   ⟨⟩-COCH₂CONH-⟨⟩
   OCH₃

3. ⟨⟩-COCH₂CONH-⟨⟩-NHCOCH-O-⟨⟩-C₄H₉
   OCH₃                    CH₃

4. ⟨⟩-COCH₂CONH-⟨⟩
   OCH₃          NH-COCH-O-⟨⟩-C₄H₉
                      CH₃

5. ⟨⟩-COCH₂CONH-⟨⟩-NHCOCH-O-⟨⟩-C₄H₉
   OC₃H₇(n)              CH₃

6. ⟨⟩-COCH₂CONH-⟨⟩-NHCO-CH-O-⟨⟩-C₅H₁₁
   OCH₃                   C₂H₅

7. ⟨⟩-COCH₂CONH-⟨⟩-NHCOCH-O-⟨⟩-C₅H₁₁
   OCH₃                   CH₃

8. ⟨⟩-COCH₂CONH-⟨⟩-SO₂-N-⟨⟩-CH₃
   OCH₃               (CH₂)₃
                         |
                        ⟨⟩

9. ⟨⟩-COCH₂CONH-⟨⟩
   OCH₃          Cl

10. CH₃
    ⟨⟩-COCH₂CONH-⟨⟩
    OCH₃          Cl

11. 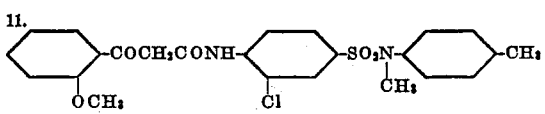

12. 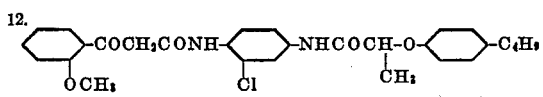

13. 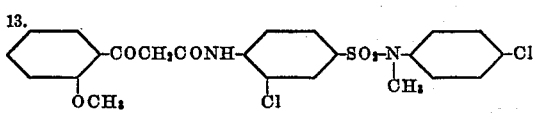

14. 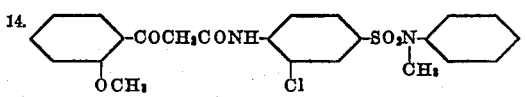

15. 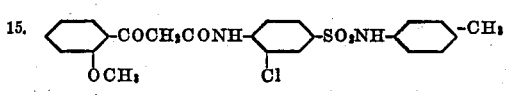

16. 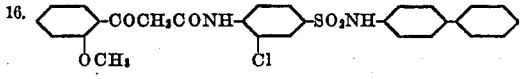

17. 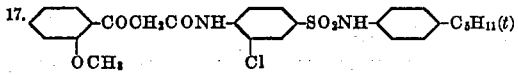

18. 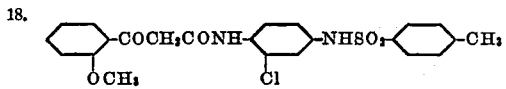

19. 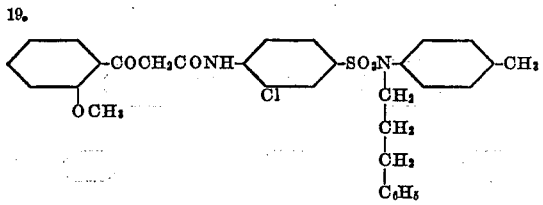

20. 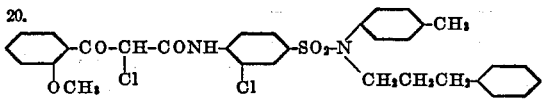

21. 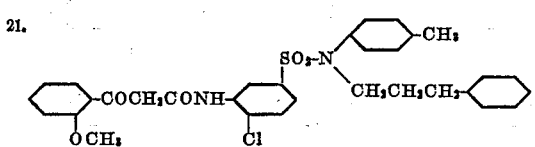

22. 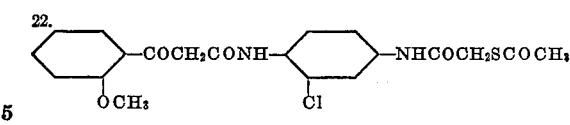

The couplers used according to our invention with the exception of 20 and 22 are prepared by treating the appropriate amine with the appropriate o-alkoxybenzoylacetic ester. For example, the coupler 21 is prepared as follows:

N-[3-(2''-methoxybenzoylacetamino)-4-chlorosulfonyl]-N-(γ-phenyl-n-propyl)-p-toluidine

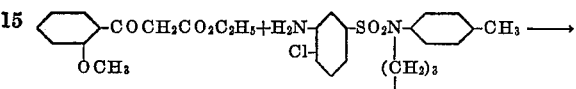

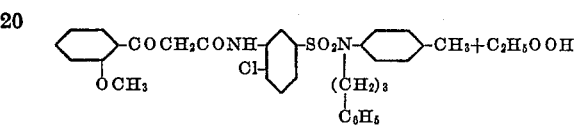

A 500 cc. three-necked flask fitted with a stirrer, an addition funnel used for solids, and a 10" distilling column, was charged with 29 cc. (32 grams, 0.15 mole) of ethyl o-methoxybenzoylacetate and 60 cc. of bromobenzene. The flask was immersed in an oil bath maintained at 170–200°, stirring was begun, and 47 grams (0.11 mole) of N-(3-amino-4-chlorobenzenesulfonyl)-N-(γ-phenyl-n-propyl)-p-toluidine was added portionwise during one hour. Alcohol distills and the temperature at the head of the distilling column remains at 75–80° until the reaction is complete. After a total reaction time of 1.5 hours, the temperature of the vapors dropped to ca. 60°. The reaction mixture was cooled and diluted with 350 cc. of petroleum ether. The oil which separated crystallized when stirred for a short time. The yield of crude product amounted to 65.7 g., M. P. 99–101°. It was recrystallized twice from 500 cc. of alcohol; yield, 44 g. (66%), M. P. 119.5–122°.

*Molecular weights*

Ethyl o-methoxybenzoylacetate _____ 222
N-(3-amino-4-chlorobenzenesulfonyl)-N-(γ-phenylpropyl)-p-toluidine _____ 414.5
Product _____ 590.5

The appropriate esters and amines are listed in the following table:

| Ester | Amine | Coupler number |
|---|---|---|
| Ethyl o-methoxybenzoylacetate | Aniline | 1 |
| Ethyl 2-methoxy-5-methylbenzoylacetate | do | 2 |
| Ethyl o-methoxybenzoylacetate | 4-[a-(4'-ter.-butylphenoxy)propionamido]aniline | 3 |
| Do | 3-[a-(4'-ter.-butylphenoxy)propionamido]aniline | 4 |
| Ethyl o-propoxybenzoylacetate | 4-[a-(4'-ter.-butylphenoxy)propionamido]aniline | 5 |
| Ethyl o-methoxybenzoylacetate | 4-[a-(4'-ter.-amylphenoxy)butyramido]aniline | 6 |
| Do | 4-[a-(4'-ter.-amylphenoxy)propionamido]aniline | 7 |
| Do | N-(p-aminobenzenesulfonyl)-N-(γ-phenyl-n-propyl)-p-toluidine | 8 |
| Do | o-Chloroaniline | 9 |
| Ethyl 2-methoxy-5-methylbenzoylacetate | do | 10 |
| Ethyl o-methoxybenzoylacetate | 4-amino-3-chlorobenzenesulfonmethyl-p-toluide | 11 |
| Do | 4-[a-(4'-ter.-butylphenoxy)propionamido]-3-chloroanilide | 12 |
| Do | 4-amino-3-chlorobenzenesulfonmethyl-p-chloroanilide | 13 |
| Do | 4-amino-3-chlorobenzenesulfonmethylanilide | 14 |
| Do | 4-amino-3-chlorobenzenesulfon-p-toluide | 15 |
| Do | 4-(4'-amino-3-chlorobenzenesulfonamido)diphenyl | 16 |
| Do | N-(4'-amino-3-chlorobenzenesulfonyl)-4-ter.amylaniline | 17 |
| Do | 4-(4'toluenesulfonamido)-2-chloroaniline | 18 |
| Do | N-(4-amino-3-chlorobenzenesulfonyl)-N-(γ-phenyl-n-propyl)-p-toluidine | 19 |

Coupler 20 is prepared by chlorinating coupler 19 with sulfuryl chloride in chloroform solution.

Coupler 22 is prepared by condensing 4(2'-methoxy-benzoylacetamino) 3-chloroaniline with acetylthioglycolyl chloride with a suitable condensing agent such as sodium acetate or quinoline.

Our couplers may be used in processes in which the coupler is incorporated in the developing solution such as those described in Mannes and Godowsky U. S. Patent 2,113,329, granted April 5, 1938, or Mannes, Godowsky and Wilder U. S. Patent 2,252,718, granted August 19, 1941, or may be incorporated in the sensitive emulsion layer as described in Fisher U. S. Patent 1,055,155, Mannes and Godowsky U. S. Patent 2,304,940, granted December 15, 1942, and Jelley and Vittum U. S. Patent 2,322,027, granted June 15, 1943.

The following example illustrates a developing solution containing a coupler according to our invention:

A. 2-amino-5-diethylamino toluene HCl
grams__ 2
Sodium sulfite (anhydrous)_____do____ 2
Sodium carbonate (anhydrous)___do____ 20
Potassium bromide_____do____ 1
Water to_____liters__ 1

B. Orthomethoxy benzoyl acetanilide
grams__ 2
Sodium hydroxide (10% solution)___cc__ 10

(For use, B is added to A.)

The foregoing example refers to the addition of the coupler compound to the developing solution itself. The coupler may also be added to the emulsion layer. In the case of multilayer coatings, it is desirable to provide means to prevent diffusion of the coupler and the adjacent layers. Also dispersing agents may be used for incorporating the coupler compound in the emulsion and in certain cases the coupler may be absorbed or adsorbed to the sensitive salt or may be combined with the sensitive salt as a chemical combination. Certain of the coupler compounds described above such as Nos. 3, 4, 5, 6, 7, 8, 11, 12, 13, 14, 17, 19, 20 and 21, are in themselves non-diffusing and may be incorporated in the photographic layer without the use of additional agents to prevent diffusion. These couplers may also be incorporated in the emulsion layer according to the methods of Mannes and Godowsky U. S. Patent 2,304,940 and Jelley and Vittum U. S. Patent 2,322,027 referred to above.

In the development of exposed photographic silver halide emulsion layers using the couplers of our invention, any color-forming developer containing a primary amino group may be used. These include developers having two primary amino groups as well as those having one of the amino groups substituted or having substituents in the ring, such as the alkyl phenylene diamines. These compounds are usually used in the salt form, such as the hydrochloride or the sulfate which are more stable than the amines themselves. The suitable compounds are diethyl-p-phenylenediamine hydrochloride, monomethyl-p-phenylenediamine hydrochloride, dimethyl-p-phenylene-diamine hydrochloride, and 2-amino-5-diethylaminotoluene hydrochloride. The p-amino phenols and their substitution products may also be used where the amino group is unsubstituted. All of these developers have an unsubstituted amino group which enables the oxidation products of the developer to couple with the color-forming compounds to form a dye image.

Our development process may be employed for the production of colored photographic images in layers of gelatin or other water-permeable colloidal carriers, such as albumin, collodion organic esters of cellulose, or synthetic resins. The carrier may be supported by a transparent medium such as glass, a cellulose ester or synthetic resin or a non-transparent reflecting medium such as paper or an opaque cellulose ester. The emulsion may be coated as a single layer on the support or as superposed layers on one or both sides of the support. The superposed layers may be differentially sensitized and the dyes formed therein by coupling may be bleached by an oxidizing agent such as chromic acid to colorless soluble compounds. The destruction of the dye in this way does not destroy the silver image and a silver image may be developed, bleached and developed to color images in superposed layers as described, for example, in Mannes and Godowsky U. S. Patent No. 2,113,329.

The examples and compounds set forth in the present specification are illustrative only and it is to be understood that our invention is to be taken as limited only by the scope of the appended claims.

We claim:

1. A color-forming photographic developer comprising a primary aromatic amino developing agent and an o-alkoxybenzoyl-acetanilide coupler compound.

2. A color-forming photographic developer comprising a primary aromatic amino developing agent and a coupler compound having the following probable formula:

$$\langle\bigcirc\rangle-COCH_2CONH-R'$$
$$\phantom{xxx}|$$
$$\phantom{xxx}OR$$

where R is an alkyl radical and R' is an aromatic nucleus of the benzene series.

3. A color-forming photographic developer comprising a primary aromatic amino developing agent and a coupler compound having the following probable formula:

$$\langle\bigcirc\rangle-COCH_2CONH-\langle\bigcirc\rangle-Y$$
$$\phantom{xxxx}|$$
$$\phantom{xxxx}OR$$

where R is an alkyl radical and Y is an acid amide group.

4. A color-forming photographic developer comprising a primary aromatic amino developing agent and a coupler compound having the following probable formula:

$$\langle\bigcirc\rangle-COCH_2CONH-\langle\bigcirc\rangle-Y$$
$$\phantom{xxxx}|\phantom{xxxxxxxxx}|$$
$$\phantom{xxxx}OR\phantom{xxxxxxxx}Cl$$

where R is an alkyl radical and Y is an acid amide group.

5. A color-forming photographic developer comprising a primary aromatic amino developing agent and a coupler compound having the following probable formula:

$$\langle\bigcirc\rangle-COCH_2CONH-\langle\bigcirc\rangle-SO_2N-R'$$
$$\phantom{xxx}|\phantom{xxxxxxxxx}|\phantom{xxxxxx}|$$
$$\phantom{xxx}OCH_3\phantom{xxxxx}Cl\phantom{xxxxx}X$$

where R' is an aromatic nucleus of the benzene series, and X is selected from the class consisting of hydrogen, alkyl, and aralkyl groups.

6. A color-forming photographic developer comprising a primary aromatic amino developing agent and a coupler compound having the following probable formula:

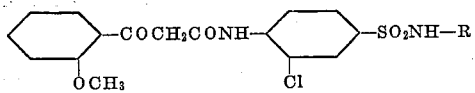

where R is an aromatic nucleus of the benzene series.

7. The method of producing a yellow photographic image in a gelatino-silver halide emulsion layer, which comprises exposing said layer and developing it with a primary aromatic amino developing agent in the presence of an o-alkoxy-benzoyl-acetanilide coupler compound.

8. The method of producing a yellow photographic image in a gelatino-silver halide emulsion layer, which comprises exposing said layer and developing it with a primary aromatic amino developing agent in the presence of a coupler compound having the probable formula:

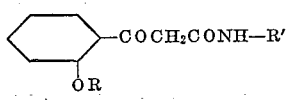

where R is an alkyl radical and R' is an aromatic nucleus of the benzene series.

9. The method of producing a yellow photographic image in a gelatino-silver halide emulsion layer, which comprises exposing said layer and developing it with a primary aromatic amino developing agent in the presence of a coupler compound having the probable formula:

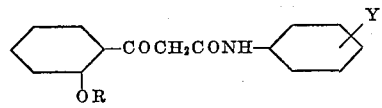

where R is an alkyl radical and Y is an acid amide group.

10. The method of producing a yellow photographic image in a gelatino-silver halide emulsion layer, which comprises exposing said layer and developing it with a primary aromatic amino developing agent in the presence of a coupler compound having the probable formula:

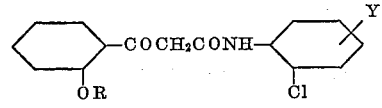

where R is an alkyl radical and Y is an acid amide group.

11. The method of producing a yellow photographic image in a gelatino-silver halide emulsion layer, which comprises exposing said layer and developing it with a primary aromatic amino developing agent in the presence of a coupler compound having the probable formula:

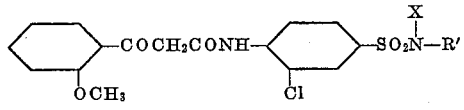

where R' is an aromatic nucleus of the benzene series, and X is selected from the class consisting of hydrogen, alkyl, and aralkyl groups.

12. The method of producing a yellow photographic image in a gelatino-silver halide emulsion layer, which comprises exposing said layer and developing it with a primary aromatic amino developing agent in the presence of a coupler compound having the probable formula:

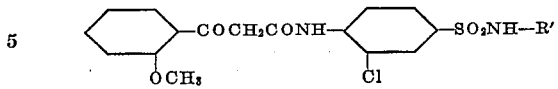

where R' is an aromatic nucleus of the benzene series.

13. A photographic emulsion for forming colored images comprising a water-permeable, colloidal carrier containing a sensitive silver halide and a coupler compound having the probable formula:

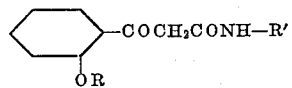

where R is an alkyl radical and R' is an aromatic nucleus of the benzene series.

14. A photographic emulsion for forming colored images comprising a water-permeable, colloidal carrier containing a sensitive silver halide and a coupler compound having the probable formula:

where R is an alkyl radical and Y is an acid amide group.

15. A photographic emulsion for forming colored images comprising a water-permeable, colloidal carrier containing a sensitive silver halide and a coupler compound having the probable formula:

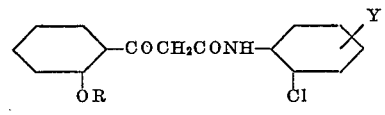

where R is an alkyl radical and Y is an acid amide group.

16. A photographic emulsion for forming colored images comprising a water-permeable, colloidal carrier containing a sensitive silver halide and a coupler compound having the probable formula:

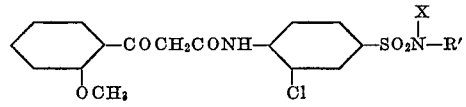

where R' is an aromatic nucleus of the benzene series, and X is selected from the class consisting of hydrogen, alkyl, and aralkyl groups.

17. A photographic emulsion for forming colored images comprising a water-permeable, colloidal carrier containing a sensitive silver halide and a coupler compound having the probable formula:

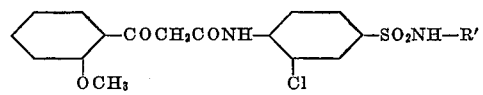

where R' is an aromatic nucleus of the benzene series.

ARNOLD WEISSBERGER.
CHARLES J. KIBLER.
PAUL W. VITTUM.